(12) United States Patent
Hinnant, Jr. et al.

(10) Patent No.: US 9,221,555 B2
(45) Date of Patent: Dec. 29, 2015

(54) STRUCTURAL HEALTH MANAGEMENT WITH ACTIVE CONTROL USING INTEGRATED ELASTICITY MEASUREMENT

(71) Applicant: The Boeing Company, Chicago, IL (US)

(72) Inventors: Harris O. Hinnant, Jr., Seattle, WA (US); Darin W. Brekke, Fox Island, WA (US); David J. Black, Jr., Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/506,645

(22) Filed: Oct. 4, 2014

(65) Prior Publication Data

US 2015/0032325 A1    Jan. 29, 2015

Related U.S. Application Data

(62) Division of application No. 13/153,469, filed on Jun. 6, 2011, now Pat. No. 8,880,242.

(51) Int. Cl.
| | | |
|---|---|---|
| *B64D 45/00* | (2006.01) | |
| *G05D 1/00* | (2006.01) | |
| *B64C 13/16* | (2006.01) | |
| *G05D 1/02* | (2006.01) | |
| *G01L 1/26* | (2006.01) | |
| *G01M 5/00* | (2006.01) | |
| *G01P 15/00* | (2006.01) | |
| *G07C 5/08* | (2006.01) | |

(52) U.S. Cl.
CPC ............... *B64D 45/00* (2013.01); *B64C 13/16* (2013.01); *G01L 1/26* (2013.01); *G01M 5/0041* (2013.01); *G01P 15/00* (2013.01); *G05D 1/0066* (2013.01); *G05D 1/0204* (2013.01); *G07C 5/0841* (2013.01); *B64D 2045/0085* (2013.01); *G07C 5/08* (2013.01)

(58) Field of Classification Search
USPC .................................................. 701/3
See application file for complete search history.

(56) References Cited

U.S. PATENT DOCUMENTS

| | | | | |
|---|---|---|---|---|
| 2,332,994 | A * | 10/1943 | Draper ................... | G01P 15/11 336/30 |
| 5,042,752 | A * | 8/1991 | Surauer ................ | G05D 1/0883 244/164 |
| 7,307,585 | B2 * | 12/2007 | Hinnant, Jr. ......... | G01M 5/0016 342/357.22 |
| 7,725,224 | B2 * | 5/2010 | Goupil ............... | G05B 23/0254 701/3 |
| 8,160,770 | B2 * | 4/2012 | Goupil ................ | B64C 13/50 244/99.11 |

(Continued)

FOREIGN PATENT DOCUMENTS

GB         1439782 A *  6/1976 ........... G05D 1/0816

OTHER PUBLICATIONS

GB1208474.5—Combined Search and Examination Report, Sep. 21, 2012.

*Primary Examiner* — Shelley Chen
(74) *Attorney, Agent, or Firm* — McDonnell Boehnen Hulbert & Berghoff LLP

(57) ABSTRACT

A system and method for actively controlling a structure is disclosed. At least one non-optimal event is identified in real-time based on at least one real-time elasticity measurement, if an event threshold exceeds a predetermined value. In response to an active control command, a control mechanism is then activated in real-time to compensate for the non-optimal event.

20 Claims, 5 Drawing Sheets

(56) References Cited

U.S. PATENT DOCUMENTS

| | | | | |
|---|---|---|---|---|
| 2003/0234324 A1* | 12/2003 | Kubica | .................... | B64C 13/16 244/195 |
| 2004/0245388 A1* | 12/2004 | Kubica | .................... | B64C 13/16 244/76 R |
| 2006/0255206 A1* | 11/2006 | Jolly | ....................... | B64C 19/00 244/76 R |
| 2007/0018054 A1* | 1/2007 | Enzinger | .............. | G05D 1/0066 244/195 |
| 2007/0096979 A1* | 5/2007 | Hinnant, Jr. | ........ | G01M 5/0016 342/357.22 |
| 2007/0124038 A1* | 5/2007 | Goupil | ............... | G05B 23/0254 701/31.1 |
| 2008/0265104 A1* | 10/2008 | Fabre-Raimbault | . | G05D 1/0623 244/76 C |
| 2010/0076624 A1* | 3/2010 | Hinnant, Jr. | ......... | G01C 21/165 701/4 |
| 2010/0152925 A1* | 6/2010 | Goupil | .................... | B64C 13/50 701/3 |

\* cited by examiner

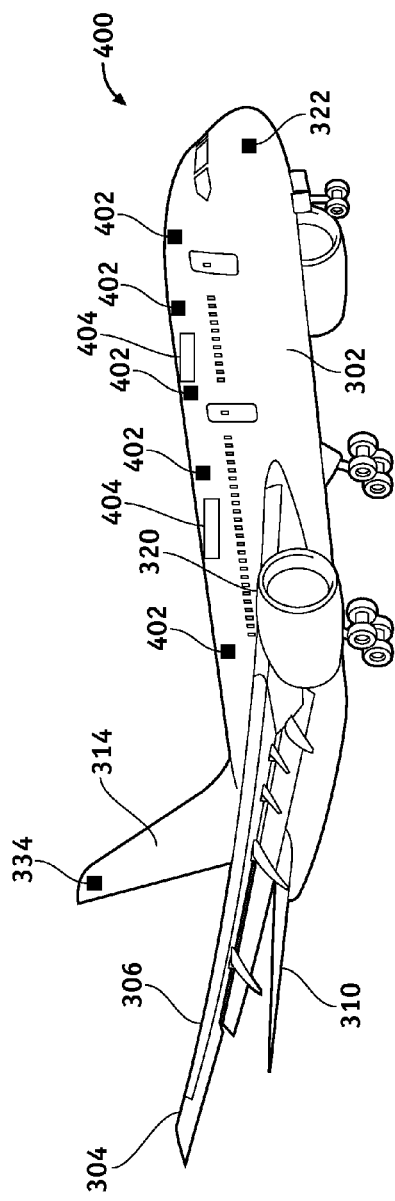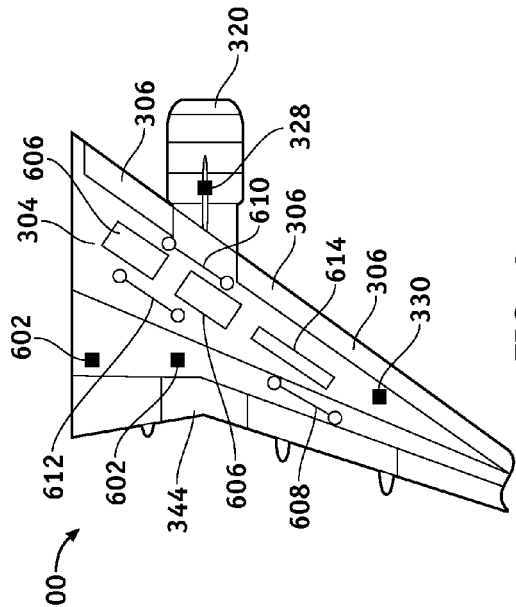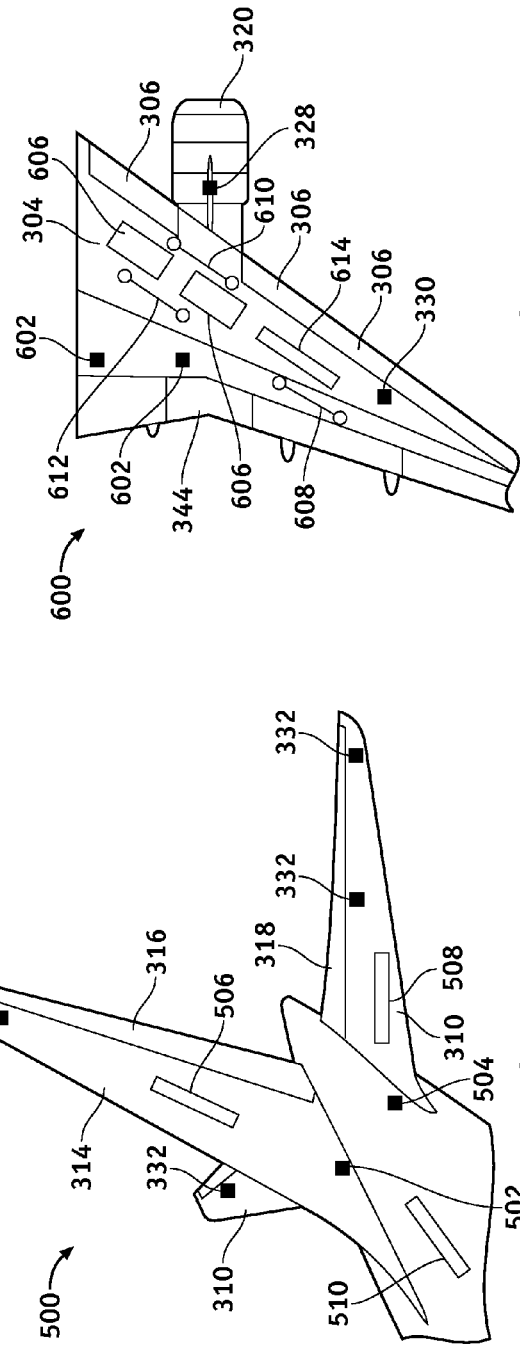

STRUCTURAL HEALTH MANAGEMENT WITH ACTIVE CONTROL USING INTEGRATED ELASTICITY MEASUREMENT

CROSS REFERENCE TO RELATED APPLICATIONS

The present application is a divisional application of U.S. patent application Ser. No. 13/153,469, filed Jun. 6, 2011 the entire contents of which are incorporated entirely herein by reference.

FIELD

Embodiments of the present disclosure relate generally to methods and systems for active control. More particularly, embodiments of the present disclosure relate to real-time active control of a structure using elasticity measurements.

BACKGROUND

In some conditions, structures such as vehicle or airplane structures may receive forces such as flexing forces due to operation forces such as changes in aerodynamic loading and unexpected forces such as wind gusts. Such structures may comprise elasticity allowing an elastic response to such forces. Operational health of such structures may be adversely affected by a non-optimal elastic response to these forces.

SUMMARY

A system and method for actively controlling a structure is disclosed. At least one non-optimal event is identified in real-time based on at least one real-time elasticity measurement, if an event threshold exceeds a predetermined value. A control mechanism is then activated in real-time to compensate for the non-optimal event. In this manner, a non-optimal structural event due to an unexpected event is alleviated using event threshold values based on the at least one real-time elasticity measurement by actively controlling a control surface and/or a lift surface of a vehicle. Thereby, structural life is prolonged and time between maintenance events is reduced.

In an embodiment, a method for actively controlling a structure identifies at least one non-optimal event in real-time based on at least one real-time elasticity measurement, if an event threshold exceeds a predetermined value. The method further activates a control mechanism in real-time to compensate for the at least one non-optimal event in response to an active control command.

In another embodiment, a system actively controls a structure in real-time. An event identifier module is operable to identify at least one non-optimal event in real-time based on at least one real-time elasticity measurement, if an event threshold exceeds a predetermined value. An active control initiation module is operable to activate a control mechanism in real-time to compensate for the at least one non-optimal event in response to an active control command.

In yet another embodiment, a flight control method for actively compensating for a non-optimal event in an aircraft structure in-flight, receives a Vehicle Structural Health (VSH) threshold from a VSH threshold database in-flight. The method further identifies at least one non-optimal event in real-time, if the VSH threshold exceeds a predetermined value, and compensates for the non-optimal event by activating a control mechanism in real-time in response to an active control command.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

FIGS. 4-6 are illustrations of a perspective view, tail section and a wing section of the exemplary aircraft of FIG. 3 respectively according to an embodiment of the disclosure.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to control laws, control systems, elasticity measurement techniques, inertial measurement sensors, data transmission, signaling, network control, and other functional aspects of the systems (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, active control of an aircraft structure. Embodiments of the disclosure, however, are not limited to such aircraft structure control, and the techniques described herein may also be utilized in other applications. For example but without limitation, embodiments may be applicable to manned and unmanned ground, air, space, water and underwater vehicles, buildings, windmills, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
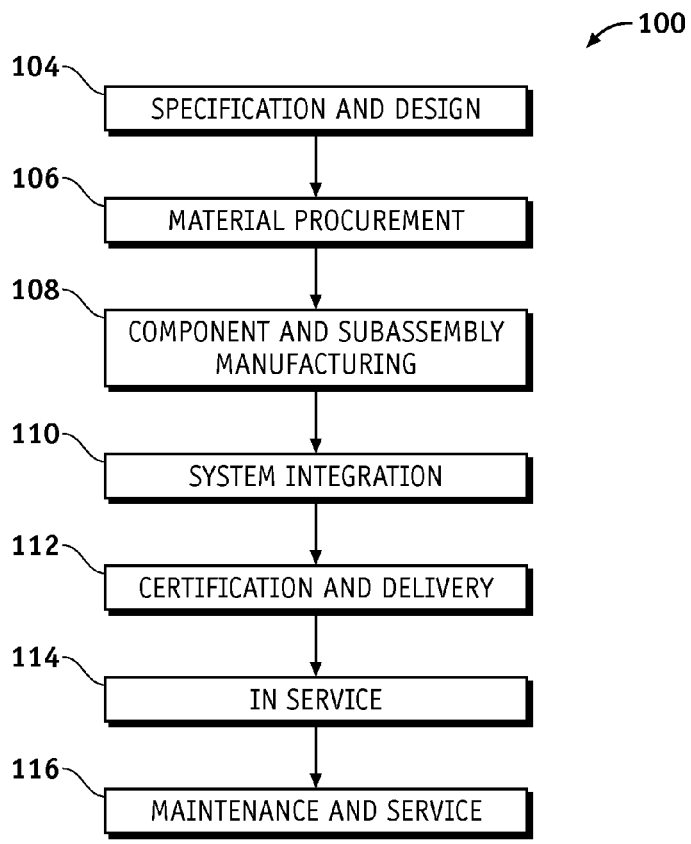
FIG. 1 is an illustration of a flow diagram of an exemplary aircraft production and service methodology.
Figure 2:
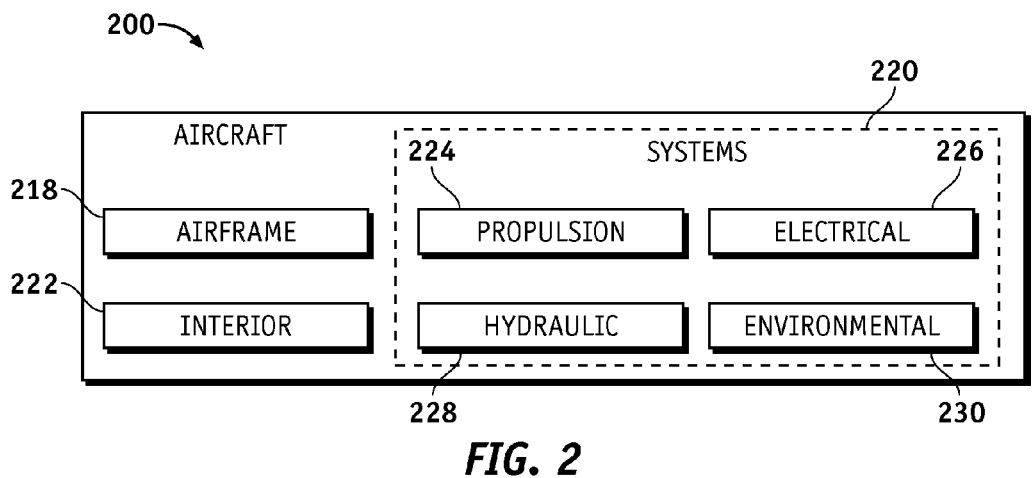
FIG. 2 is an illustration of an exemplary block diagram of an aircraft.

Referring more particularly to the drawings, embodiments of the disclosure may be described in the context of an aircraft manufacturing and service method 100 (method 100) as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220 and an interior 222. Examples of high-level systems 220 include one or more of a propulsion system 224, an electrical system 226, a hydraulic system 228, and an environmental system 230. Any number of other systems may also be included. Although an aerospace example is shown, the embodiments of the disclosure may be applied to other industries.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. In addition, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Existing solutions use real-time aeroelasticity measurements for active wing control, and/or for vehicle structural health monitoring. In contrast to the existing solutions, an important part of an embodiment of the disclosure is real-time active control using control surfaces based on an event threshold derived from the real-time aeroelasticity measurements. Alternatively, in other embodiments, the real-time active control may be applied through, for example but without limitation, propulsion methods, active flow control, shaped metal alloys or other active structural materials that expand or contract as a function of a control signal, a combination thereof, and the like. Flexible structures that can be actively controlled according to various embodiments of the disclosure may be constructed and designed for a real-time control by any combination of these methods, using internal actuators suitable for such control.

Embodiments of the disclosure provide a flight control subsystem that uses aeroelasticity measurements (e.g., wing twist and bending) and a structure (wing or airframe) designed for active control (via actuators or propulsion system methods) to perform vehicle structural health management in real-time. The flight control subsystem operates via an Integrated Aeroelasticity Measurement System (IAMS) controller on the aircraft that collects real-time aeroelasticity measurements such as twist measurements from inertial sensors located in the airframe as explained in more detail in the context of discussion of FIGS. 3-6.

These aeroelasticity measurements may be used in various ways. In real-time, the aeroelasticity measurements are generally used to control the airframe (wing) for performance. In ground or post processing, design data (e.g., comprising designed-to aeroelasticity limits and the like) and the aeroelasticity measurements are used to create an aeroelasticity database for the airframe that then provides Vehicle Structural Health (VSH) thresholds for use in real-time decisions by the IAMS controller. In real-time, the IAMS normally controls the structure for performance at cruise conditions, but also monitors the real-time twist data for Integrated Vehicle Health Management (IVHM) events. These events may be structural anomalies resulting from impact or aileron anomaly, or structural stress resulting from wind shear or gust conditions.

Upon detecting an IVHM event, condition data are forwarded to the flight control subsystem which prepares the IVHM controller to drive the airframe structure into a more favorable state such as, for example but without limitation, minimizing vibration or flutter due to structural excessive impact, compensating for aileron non-optimal operation, reducing airframe stress resulting from shear or gust, and the like.

Embodiments of the disclosure use the aeroelasticity database and the VSH thresholds derived from the aeroelasticity database, to actively control the aircraft structure in real-time or near-real-time for the purpose of responding to unexpected events such as but without limitation, impact, aileron anomaly, wind shear, gust, and the like. The embodiments also provide active control of the structure to lower fatigue stress detected (via the long-term aeroelasticity database), thereby prolonging structural life and reducing time between maintenance events.

The term real-time refers to a signal that is continuously being sent and received, with little or no time delay. The term near-real-time refers to a real-time signal with substantially no significant time delay. The time delay may be a delay introduced by, for example but without limitation, automated data processing or network transmission, between occurrence of an event, and the like. In this document, the term real-time refers to both real-time and near-real-time.

Figure 3:
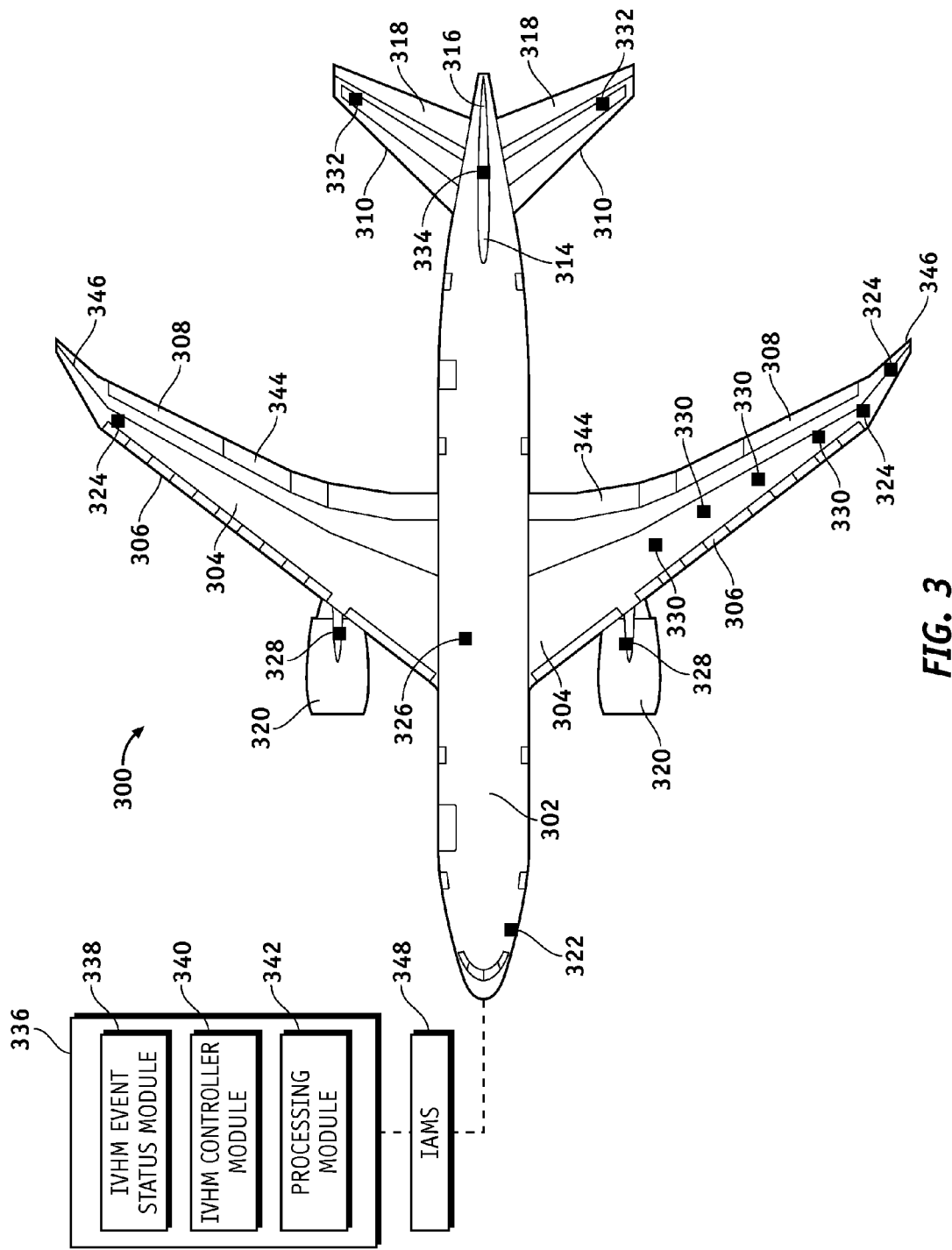
FIG. 3 is an illustration of an exemplary aircraft comprising a system for actively controlling aircraft structure in real-time, according to an embodiment of the disclosure.

FIG. 3 is an illustration of an exemplary aircraft 300 comprising a system for actively controlling the aircraft 300 in real-time according to an embodiment of the disclosure. The aircraft 300 may comprise an active control system 336, a plurality of control surfaces and a plurality of lift surfaces, and an Integrated Aeroelasticity Measurement System (IAMS) 348.

The active control system 336 is operable to activate the control surfaces and the lift surfaces in real-time to compensate for a non-optimal event, if an unexpected event occurs. The active control system 336 may comprise an IVHM event status module 338, an IVHM controller module 340, and a processing module 342 as explained in more detail in context of discussion FIG. 7 below. The control surfaces may comprise, for example but without limitation, a landing gear door (not shown), a flight control surface such as a slat 306, an aileron 308, a tail 314, a rudder 316, an elevator 318, a flap 344, a spoiler 606 (FIG. 6), and the like. The lift surfaces may comprise, for example but without limitation, a fuselage 302, a wing 304, a canard (not shown), a horizontal stabilizer 310, and the like.

The non-optimal event may comprise, for example but without limitation, an in-flight operation, a stress from wind shear on a lift surface such as the fuselage 302, a stress from a debris impact on a lift surface such as the horizontal stabilizer 310, a stress from a gust on a lift surface such as the wing 304, a vibration or flutter on the wing 304, a fuselage flexure such as flexure on the fuselage 302, an excessive bending of the fuselage 302, a propulsion system anomaly such as an anomaly in the propulsion system 320 (engine 320), an excessive linear displacement, an excessive angular displacement, a structural fatigue, a control surface anomaly, a lift surface anomaly such as a winglet 346 anomaly, and the like.

The aircraft 300 may also comprise the IAMS 348 to collect data from measurement navigation units, such as inertial measurement units ("IMUs"), located at various measurement points of interest on the aircraft 300 as explained in more detail below. The IAMS 348 also collects data from a reference IMU, which is preferably located in the fuselage 302. The reference IMU is treated as a fixed reference point that is not subject to twisting, bending, or displacement during flight. The IMU provides a measure of angle and velocity change over a small period of time. In practice, the IAMS 348 may measure real-time twist relative to the reference IMU but also may compute the twist between measurement IMUs at various measurement points. The aircraft 300 may incorporate an aeroelasticity measurement system described in commonly owned U.S. Pat. No. 7,307,585, which is incorporated by reference herein in its entirety.

The IAMS 348 within the aircraft 300 is installed in the aircraft 300 to provide in-flight wing/tail/fuselage twist and deflection data to a flight control system (not shown). The IAMS 348 shown in FIG. 3 generally may comprise, for example but without limitation, a reference navigation IMU 326 coupled to the processing module 342, a plurality of measurement navigation IMUs 324/328/330/332/334 coupled to the processing module 342, and a GPS receiver (not shown) coupled to the processing module 342. A practical embodiment may comprise, for example but without limitation, any number of measurement navigation IMUs located throughout the aircraft 300, and the location of such measurement navigation IMUs need not be restricted to the locations shown in FIG. 3. For example, other possible locations of the measurement navigation IMUs are shown in FIGS. 4-6.

FIGS. 4-6 are illustrations of a perspective view (aircraft 400) of the exemplary aircraft 300 of FIG. 3, tail section 500, and a wing section 600 thereof respectively according to an embodiment of the disclosure. The IMUs 328-334, 402, and 502-504 in FIGS. 4-6 are distributed throughout the fuselage 302, the wing 304, the tail section 500, and the engine 320 of the aircraft 400. In the embodiment shown in FIG. 5, the IMU 502-504 may be primary reference points for aeroelastity measurement on the tail section 500. Tail IMU 334 is an alternate reference IMU point with respect to IMUs 332, provides an alternate reference for the tail section 500 aeroelasticity.

Thus, the IAMS 348 monitors the tail section 500 independently. The tail IMU 334 may be referenced to the IMU 322 as well. IMUs 328 are located in the engine 320 struts, IMUs 402 are located on an upper mid-body of the fuselage 302, and IMUs 602 and 330 are located in the wing 304, as these locations represent structural areas of interest for which conditions may be monitored. The IMU 322 is located at a nose location to measure body bending and stress at that extreme. One skilled in the art will recognize many embodiments with more (or less) sensors and different locations are possible.

Figure 7:
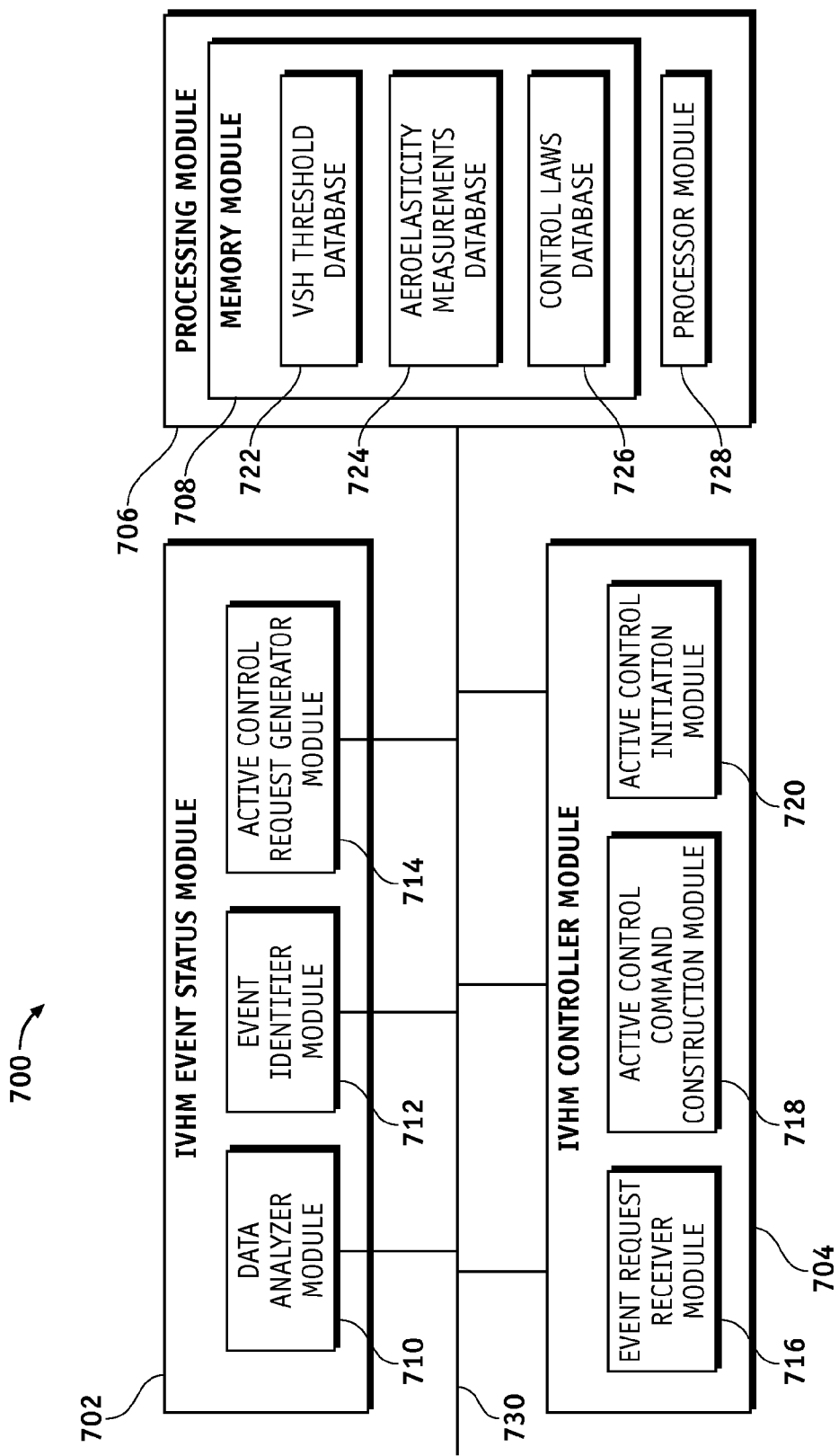
FIG. 7 is an illustration of an exemplary functional block diagram of an active structure control system according to an embodiment of the disclosure.

FIG. 7 is an illustration of an exemplary functional block diagram of an active structure control system 700 (system 700) (336 in FIG. 3) suitable for use with the IAMS 348 described above to control and operate one or more control mechanisms in real-time to compensate for a non-optimal event that may occur unexpectedly. The various illustrative blocks, modules, processing logic, and circuits described in connection with system 700 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

The system 700 may comprise, for example but without limitation, a desktop, a laptop or notebook computer, a hand-held computing device (PDA, cell phone, palmtop, etc.), a mainframe, a server, a client, or any other type of special or general purpose computing device as may be desirable or appropriate for a given application or environment. The system 700 generally comprises an IVHM event status module 702 (338 in FIG. 3), an IVHM controller module 704 (340 in FIG. 3), and a processing module 706 (342 in FIG. 3). These components may be coupled to and communicate with each other via a network bus 730.

The IVHM event status module 702 may comprise a data analyzer module 710, an event identifier module 712, and an active control request generator module 714.

The data analyzer module 710 is configured to receive the event threshold from the VSH threshold database 722.

The event identifier module 712 is configured to identify at least one non-optimal event in real-time based on real-time elasticity measurements, if the event threshold exceeds a predetermined value. The predetermined values may comprise, for example but without limitation, nominal twist and twist gradients from tail to nose, wing tip to wing tip, reference navigation IMU 326 to each measurement navigation IMU 324/328-334, landing gear jerk and acceleration, and the like. These may be compiled in real-time during flight and later offloaded for ground processing into a flight aeroelasticity database such as an aeroelasticity measurements database 724 (e.g., initially seeded with design data for the vehicle).

The aeroelasticity measurements database 724 may be used to extract the event threshold using stochastic estimation or other predictive algorithms.

For example, design data and real-time aeroelasticity data collected over a number of flights have been used to create an aeroelasticity flight database for an example vehicle in ground post-processing. The aeroelasticity measurements database 724 may comprise data for an example highly flexible vehicle structure comprising, for example but without limitation, a twist from end to end of about 7 degrees with about 95% confidence. From this information, a not to exceed gradient threshold (event threshold) was established along with rules for engagement of an active control event.

For example, if the structure twists to exceed 7 degrees with a twist gradient greater than 1 degree/sec (predetermined value), the event identifier module 712 indicates a non-optimal event. An active control may then be initiated by the active control initiation module 720 to alleviate structural stress by using a control mechanism to null out the gradient and return the example structure to a twist of 7 degrees. The control mechanism may comprise, for example but without limitation, a propulsion system, controllable lift surfaces, flight control surfaces, active flow control, shaped metal alloys or other active structural materials that expand or contract as a function of a control signal, and the like.

Additionally, if the gradient is less than about 1 deg/sec but the twist exceeds about 9 degrees with about 95% confidence, the event identifier module 712 identifies a non-optimal event, and active control is initiated by the active control initiation module 720 to reduce this twist back to about 7 degrees. As an example, the IAMS 348 measures in real-time a twist of about 7 degrees with a gradient of about 1 deg/sec and when it passes through 7 degrees twist with this gradient, the twist and gradient indicate the structure may continue to stress further out of tolerance. In response, an active control event is initiated by the active control initiation module 720 to null out the twist gradient and drive the twist back towards 7 degrees. In an alternate example, the real-time twist may reach about 9 degrees with about 95% confidence with little to no twist gradient. In response, an active control event is initiated by the active control initiation module 720 to reduce the structural stress back towards 7 degrees.

The active control request generator module 714 is configured to generate an active control request signal and send the active control request signal to the IVHM controller module 704.

The IVHM controller module 704 may comprise an event request receiver module 716, an active control command construction module 718, and an active control initiation module 720. The IVHM controller module 704 may be a standalone flight control system or a subsystem of the flight control system of the aircraft 300.

The event request receiver module 716 is configured to receive the active control request from the active control request generator module 714.

The active control command construction module 718 is configured to construct an active control command based on the active control request signal.

The active control initiation module 720 activates a control mechanism in response to an active control command in real-time to compensate for the non-optimal event as explained above. The activating of the control mechanism may comprise mechanism activation of, for example but without limitation, a control surface actuation, a lift surface actuation, a propulsive power alteration, active flow control, flow control actuation, actuation of shaped memory alloys or other active structural materials that expand or contract as a function of a control signal, a combination thereof, and the like.

The lift surfaces (e.g., wing, canard, fuselage and the like) provide lift as a function of engine thrust, while the control surfaces (e.g., ailerons, flaps, rudder and the like) may be moved by means of actuators to control the aircraft flight path, commonly called flight control. Additionally, actuators such as a skin/structure actuators and the like may be also be used for flexing the lift surfaces, to a more desirable (e.g., fuel efficient) shape based on measured flight conditions received from the processing module 706.

For example but without limitation, the active control initiation module 720 may be operable to control a position of the flap 344 via control of actuators 608 (FIG. 6), control a position of the slat 306 via control of actuators 610 (FIG. 6), control a position of the spoiler 606 via control of actuators 612 (FIG. 6), and the like. Additionally, a series of actuators 404 (FIG. 4), 506-510 (FIG. 5), and 614 (FIG. 6) may be housed within the fuselage 302, tail section 500, and the wing 304 respectively, and operate based on commands received from the active control initiation module 720.

The active control initiation module 720 receives data from the control laws database 726 of the processing module 706 that provides a desired position of the control surfaces and lift surfaces suitable to alleviate a structural anomaly such as a flexure, displacement or twist of structure of the aircraft 300.

For example, if the aircraft 300 receives a gust on one side, the active control initiation module 720 reacts quickly to keep stress from becoming too great to deform the wing 304. For another example, if turbulence leads to vibration or flutter, and causes the structure of the aircraft 300 to enter a resonant frequency, the motion is sensed through the aeroelasticity measurements. After the motion is sensed, the active control command construction module 718 of the IVHM controller module 704 generates a command for the active control initiation module 720 to null out the vibration or flutter. In another example, the system 700 can also alleviate stress on at least a part of a fuselage such as an upper mid-body flexing of the fuselage 302.

In this manner, the system 700 actively controls the aircraft 300 in real-time in response to an unexpected event in various flight conditions such as take off, cruise, approach and landing, and the like, without an operator/pilot interaction. However, in one embodiment, an operator/pilot can suitably override/prevent action commanded by the active control initiation module 720 during the various flight conditions.

In the embodiment shown in FIG. 3, a commercial airplane is shown. It will be readily apparent to those of ordinary skill in the art, that the embodiment shown in FIG. 3 can have application or be adapted to non-traditional structures such as, but without limitation, high altitude long endurance vehicles whose entire structure may be a controllable highly flexible lift surface, and the like.

The illustrated embodiment is but one example, and those skilled in the art will appreciate that multiple leading and trailing edge configurations can be used, and that multiple configurations of the corresponding actuators will therefore can be used, as well as the lift surface actuators mechanically coupled to the wing structure itself (e.g., rather than a flight control surface), or any control or lift surface of the aircraft (e.g., and not just those on the wing). Moreover, as mentioned above, the embodiments are not limited to aircraft structure and may also be applicable to, for example but without limitation, any manned and unmanned ground, air, space, water and underwater vehicles, buildings, windmills, and the like.

The processing module 706 may comprise a memory module 708, and processor module 728.

The processor module 728 comprises processing logic that is configured to carry out the functions, techniques, and processing tasks associated with the operation of the system 700. In particular, the processing logic is configured to support the system 700 described herein. For example, processor module 728 may provide data from the memory module 708 to the IVHM controller module 704. For another example, the processor module 728, in one embodiment, provides desired positional changes from the control laws database 726 to the active control initiation module 720, which in turn uses the raw data to calculate adjustments to be made to control surfaces and the lift surfaces, via operation of one or more of the various actuators described above.

In this manner, the processor module 728 also accesses data stored in a database, such as databases 722-726, to support functions of the system 700. Thereby, the processor module 728 enables active control of the aircraft 300. The data may comprise, for example but without limitation, airspeed, altitude, event threshold, desired position of control surfaces (e.g., aileron 308) and desired position of the lift surface (e.g., wing 304), aeroelasticity measurements, aeroelasticity parameters, and the like, as explained in more detail below.

The processor module 728 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 708 may be a data storage area with memory formatted to support the operation of the system 700. The memory module 708 is configured to store, maintain, and provide data as needed to support the functionality of the system 700 in the manner described below. In practical embodiments, the memory module 708 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 708 may be coupled to the processor module 728 and configured to store, for example but without limitation, a VSH threshold database 722, the aeroelasticity measurements database 724, a control laws database 726, and the like. Additionally, the memory module 708 may represent a dynamically updating database containing a table for updating the databases 722-726, and the like. The memory module 708 may also store, a computer program that is executed by the processor module 728, an operating system, an application program, tentative data used in executing a program, and the like.

The memory module 708 may be coupled to the processor module 728 such that the processor module 728 can read information from and write information to the memory module 708. As an example, the processor module 728 and memory module 708 may reside in respective application specific integrated circuits (ASICs). The memory module 708 may also be integrated into the processor module 728. In an embodiment, the memory module 708 may comprise a cache memory for storing temporary variables or other intermediate information during execution of instructions to be executed by the processor module 728.

The VSH threshold database 722 comprises, for example but without limitation, the VSH threshold derived from the aeroelasticity measurements, and the like. The VSH threshold may be used to determine the event threshold as explained above. Data from the aeroelasticity measurements database 724 may be used to construct or update one or more VSH thresholds stored in the VSH threshold database 722, thereby updating the VSH threshold database 722.

The aeroelasticity measurements database 724 comprises aeroelasticity measurements, such as but without limitation, wing twist, aircraft body bending, and the like. As used herein, "aeroelasticity measurements" and "aeroelasticity parameters" refers to accelerations, jerk, attitudes, rates or like navigation state data. "aeroelasticity parameters" associated with these may include altitude, airplane type, model, weight and the like.

The control law database 726 comprises desired control surface positions, desired lift surface positions based on current flight conditions (e.g., speed, altitude, mach).

Figure 8:
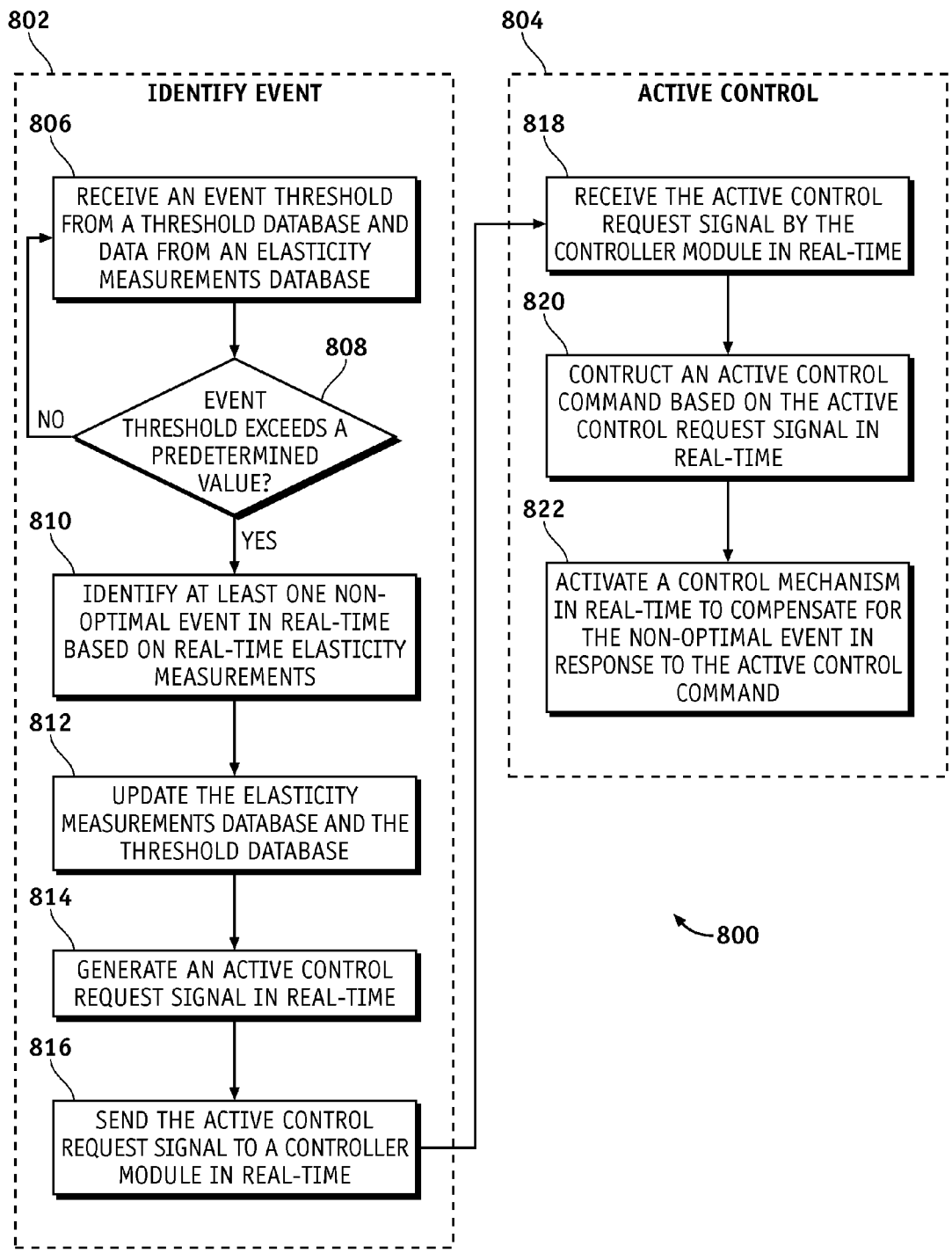
FIG. 8 is an illustration of an exemplary flowchart showing an active structure control process according to an embodiment of the disclosure.

FIG. 8 is an illustration of an exemplary flowchart showing an active structure control process according to an embodiment of the disclosure. The various tasks performed in connection with process 800 may be performed mechanically, by software, hardware, firmware, a computer-readable medium having computer executable instructions for performing the process method, or any combination thereof. It should be appreciated that process 800 may include any number of additional or alternative tasks, the tasks shown in FIG. 8 need not be performed in the illustrated order, and process 800 may be incorporated into a more comprehensive procedure or process having additional functionality not described in detail herein.

For illustrative purposes, the following description of process 800 may refer to elements mentioned above in connection with FIGS. 3-7. In practical embodiments, portions of the process 800 may be performed by different elements of the system 700 such as: the IVHM event status module 702, the IVHM controller module 704, the processing module 706, and the network bus 730. Process 800 may have functions, material, and structures that are similar to the embodiments shown in FIGS. 3-7. Therefore common features, functions, and elements may not be redundantly described here.

Process 800 may begin by identifying at least one non-optimal event in real-time based on real-time elasticity measurements, if an event threshold exceeds a predetermined value (task 802).

Process 800 may continue by activating a control mechanism in real-time to compensate for the at least one non-optimal event (task 804).

In this manner, process 800 may continue by receiving the event threshold from a database such as the VSH threshold database 722, and data from the aeroelasticity measurements database 724 (task 806).

Process 800 may continue by the event identifier module 712 determining whether the event threshold exceeds a predetermined value (inquiry task 808). If the event threshold does not exceed the predetermined value (NO branch of inquiry task 808), process 800 leads back to the task 806.

As explained above in one example, the event threshold may be based on a twist from end to end of about 7 degrees with about 95% confidence. The predetermined value may be set to structure twists exceeding 7 degrees with a twist gradient greater than 1 degree/sec. However, if the event threshold exceeds a predetermined value (YES branch of inquiry task 808), the event identifier module 712 may continue by identifying at least one non-optimal event in real-time based on real-time elasticity measurements (task 810). Thus, for this example, the event identifier module 712 indicates a non-optimal event in response to the structure twist exceeding 7 degrees with the twist gradient greater than 1 degree/sec.

Process 800 may continue by processing module 706 updating an elasticity measurement database such as the aeroelasticity measurements database 724 and a threshold database such as the VSH threshold database 722 (task 812) to obtain updated event thresholds. In task 812, the processing module 706 typically updates a flight aeroelasticity record that comprises elasticity measurements, gradients, current event thresholds and other relevant data such as aircraft load data, cruise condition, and the like. The flight aeroelasticity record is provided to the IAMS and is processed in a post-flight VSH to form a reference database such as the aeroelasticity measurements database 724 for the vehicle (e.g., aircraft 300) from which the VSH thresholds and rules for engaging a structural health management event are derived.

During flight, the system 700 updates the VSH threshold database 722 and the aeroelasticity measurements database 724 in real-time in the task 812 for post-flight processing. The aeroelasticity measurements database 724 comprises current aeroelasticity data from the task 806. However, in some embodiments, the aeroelasticity measurements database 724 and the VSH threshold database 722 may be updated in the task 806 in real-time in response to a non-optimal condition such as a control surface or propulsion anomaly. A series of major and minor repairs on a structure of the aircraft 300 can be scheduled by analyzing trends in a structure fatigue as recorded in the VSH threshold database 722 and the aeroelasticity measurements database 724 and a probability of an unanticipated non-optimal structural condition can be reduced.

Process 800 may continue by the active control request generator module 714 generating an active control request signal in real-time (task 814).

Process 800 may continue by the active control request generator module 714 sending the active control request signal in real-time (task 816) to the event request receiver module 716 of the IVHM controller module 704.

Process 800 may continue by the event request receiver module 716 receiving the active control request signal in real-time (task 818).

Process 800 may continue by the active control command construction module 718 constructing an active control command based on the active control request signal in real-time (task 820).

Process 800 may continue by the active control initiation module 720 activating a control mechanism in real-time to compensate for the non-optimal event in response to the active control command (task 822). In this manner, a non-optimal structural event due to an unexpected event is alleviated using event threshold values based on the real-time elasticity measurement by actively controlling control surfaces and/or lift surfaces of a vehicle. Alleviating the unexpected event prolongs the structural life of the aircraft 300. In this way, a system and method is provided for actively controlling a structure in real-time to alleviate a structural anomaly.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 3-7 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A control method for actively compensating for a non-optimal event in a structure, the method comprising:
   receiving a Vehicle Structural Health (VSH) threshold from a VSH threshold database in-real-time, wherein the VSH threshold is derived from real-time elasticity measurements comprising real-time relative measurements between measurement points and their respective design reference points on the structure to provide the real-time relative measurements related to design data;
   identifying at least one non-optimal event in real-time, if the VSH threshold exceeds a predetermined value; and
   compensating for the at least one non-optimal event by activating at least one control mechanism in real-time in response to an active control command, wherein the at least one non-optimal event comprises structural twisting, bending or displacement induced by at least one force received on the structure.

2. The method of claim 1, wherein the structure comprises an aircraft, a manned ground vehicle, an unmanned ground vehicle, an air vehicle, a space vehicle, a water vehicle, an underwater vehicle, a building, or a windmill.

3. The method of claim 1, wherein the identifying of the at least one non-optimal event comprises identifying of at least one member selected from the group consisting of: a stress from wind shear on a lift surface, a stress from a debris impact on a lift surface, a stress from a gust on a lift surface, a vibration, a flutter, a fuselage flexure, an excessive bending of the fuselage, a propulsion system anomaly, an excessive linear displacement, an excessive angular displacement, a structural fatigue, a control surface anomaly, and a lift surface anomaly.

4. The method of claim 1, wherein activating the at least one control mechanism comprises at least one mechanism selected from the group consisting of: a control surface actuation, a lift surface actuation, a flow control actuation, actuation of shaped memory alloys, actuation via active structural materials, and a propulsive power alteration.

5. The method of claim 1, future comprising actively compensating in-flight for the at least one non-optimal event in an aircraft structure comprising the structure.

6. The method of claim 5, wherein the at least one non-optimal event comprises an in-flight operation.

7. The method of claim 5, wherein the aircraft structure entirely comprises a controllable highly flexible lift surface.

8. The method of claim 1, further comprising updating in real-time an aeroelasticity measurements database comprising the aeroelasticity measurements, and the VSH threshold database comprising the VSH threshold, in response to the at least one non-optimal event.

9. The method of claim 1, further comprising:
generating an active control request signal in real-time;
sending the active control request signal in real-time;
receiving the active control request signal in real-time; and
constructing the active control command based on the active control request signal in real-time.

10. A system for actively controlling a structure in real-time, the system comprising:
a data analyzer module operable to receive a Vehicle Structural Health (VSH) threshold from a VSH threshold database in real-time, wherein the VSH threshold is derived from a real-time elasticity measurements comprising real-time relative measurements between measurement points and their respective design reference points on the structure to provide the real-time relative measurements related to design data;
a processing module operable to identifying at least one non-optimal event in real-time, if the VSH threshold exceeds a predetermined value; and
an active control initiation module operable to compensate for the at least one non-optimal event by activating at least one control mechanism in real-time in response to an active control command, wherein the at least one non-optimal event comprises structural twisting, bending or displacement induced by at least one force received on the structure.

11. The system of claim 10, wherein the structure comprises an aircraft, a manned ground vehicle, an unmanned ground vehicle, an air vehicle, a space vehicle, a water vehicle, an underwater vehicle, a building, or a windmill.

12. The system of claim 10, further comprising:
a processing module operable to update an elasticity measurements database and the VSH threshold database in real-time;
an active control request generator module operable to generate an active control request signal and send the active control request signal to a controller module in real-time, wherein the controller module is further operable to receive the active control request signal in real-time; and
an active control command construction module operable to construct an active control command based on the active control request signal in real-time.

13. A control method for actively compensating for a non-optimal event in a structure, the method comprising:
updating a Vehicle Structural Health (VSH) threshold database based on real-time elasticity measurements to provide an updated VSH threshold database, wherein the real-time elasticity measurements comprise relative measurements between measurement points and their respective design reference points on the structure to provide real-time relative measurements related to design data;
receiving an event threshold from the updated VSH threshold database;
identifying at least one non-optimal event in real-time, if the event threshold exceed a predetermined value; and
activating a control mechanism in real-time to compensate for the at least one non-optimal event in response to an active control command, wherein the at least one non-optimal event comprises structural twisting, bending or displacement induced by at least one force received on the structure.

14. The method of claim 13, wherein the event threshold is derived from the real-time elasticity measurements comprising the real-time relative measurements related to the design data.

15. The method of claim 13, future comprising actively compensating in-flight for the at least one non-optimal event in an aircraft structure comprising the structure.

16. The method of claim 13, wherein the structure comprises an aircraft a manned ground vehicle, an unmanned ground vehicle, an air vehicle, a space vehicle, a water vehicle, an underwater vehicle, a building, or a windmill.

17. The method of claim 13, wherein the at least one non-optimal event comprises an in-flight operation.

18. The method of claim 13, further comprising seeding an aeroelasticity database with the design data for the structure.

19. The method of claim 13, further comprising updating an aeroelasticity measurements database comprising the aeroelasticity measurements and updating the VSH threshold database comprising VSH thresholds, in real-time in response to the at least one non-optimal event.

20. The method of claim 13, further comprising detecting fatigue stress on the structure via a long-term aeroelasticity database, and lowering the fatigue stress by actively controlling the structure, thereby prolonging structural life and reducing time between maintenance events of the structure.

* * * * *